United States Patent
Bevilacqua

(10) Patent No.: US 10,437,930 B1
(45) Date of Patent: Oct. 8, 2019

(54) METHOD AND SYSTEM OF SEMIOTIC DIGITAL ENCODING

(71) Applicant: Andy Bevilacqua, Huntsville, AL (US)

(72) Inventor: Andy Bevilacqua, Huntsville, AL (US)

(73) Assignee: Bevilacqua Research Corporation, Huntsville, AL (US)

( * ) Notice: Subject to any disclaimer, the term of this patent is extended or adjusted under 35 U.S.C. 154(b) by 0 days.

(21) Appl. No.: 15/874,838

(22) Filed: Jan. 18, 2018

(51) Int. Cl.
*G06F 17/21* (2006.01)
*G06F 17/27* (2006.01)
*G06F 17/22* (2006.01)
*G06F 16/901* (2019.01)

(52) U.S. Cl.
CPC ...... *G06F 17/2785* (2013.01); *G06F 16/9024* (2019.01); *G06F 17/2252* (2013.01)

(58) Field of Classification Search
USPC ....................................... 704/7–10
See application file for complete search history.

(56) References Cited

U.S. PATENT DOCUMENTS

| | | | | |
|---|---|---|---|---|
| 7,043,094 B2 * | 5/2006 | Thomas | ............ | G06F 17/30256 382/164 |
| 2003/0113017 A1 * | 6/2003 | Thomas | ............ | G06F 17/30256 382/181 |
| 2006/0150153 A1 * | 7/2006 | Altman | .................. | G06F 21/51 717/116 |
| 2018/0053021 A1 * | 2/2018 | Rasheed | ............... | G06T 19/006 |
| 2018/0278504 A1 * | 9/2018 | Alazraki | ............ | H04L 43/0823 |

* cited by examiner

*Primary Examiner* — Leonard Saint Cyr

(74) *Attorney, Agent, or Firm* — Chris Tanner; FYPA PLLC

(57) ABSTRACT

The present disclosure provides a system and method of semiotic digital encoding, transfer, and decoding of semiotic data. In an embodiment, the present disclosure teaches a process and method of taking semantic knowledge/information and converting it into a digital format, allowing that digital format to be transmitted or communicated to a receiver and processing the digital format back to the semantic knowledge/information.

5 Claims, 4 Drawing Sheets

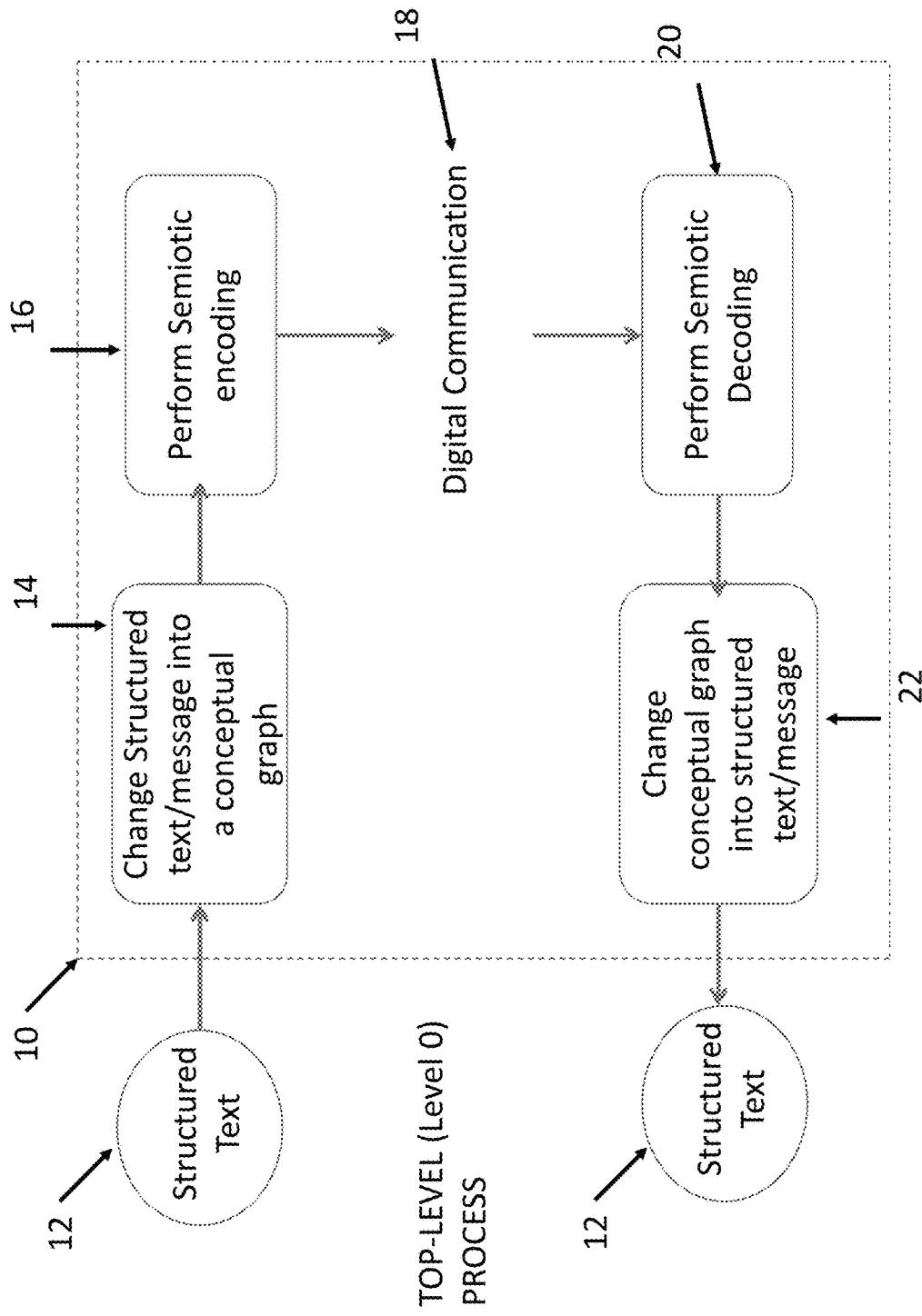

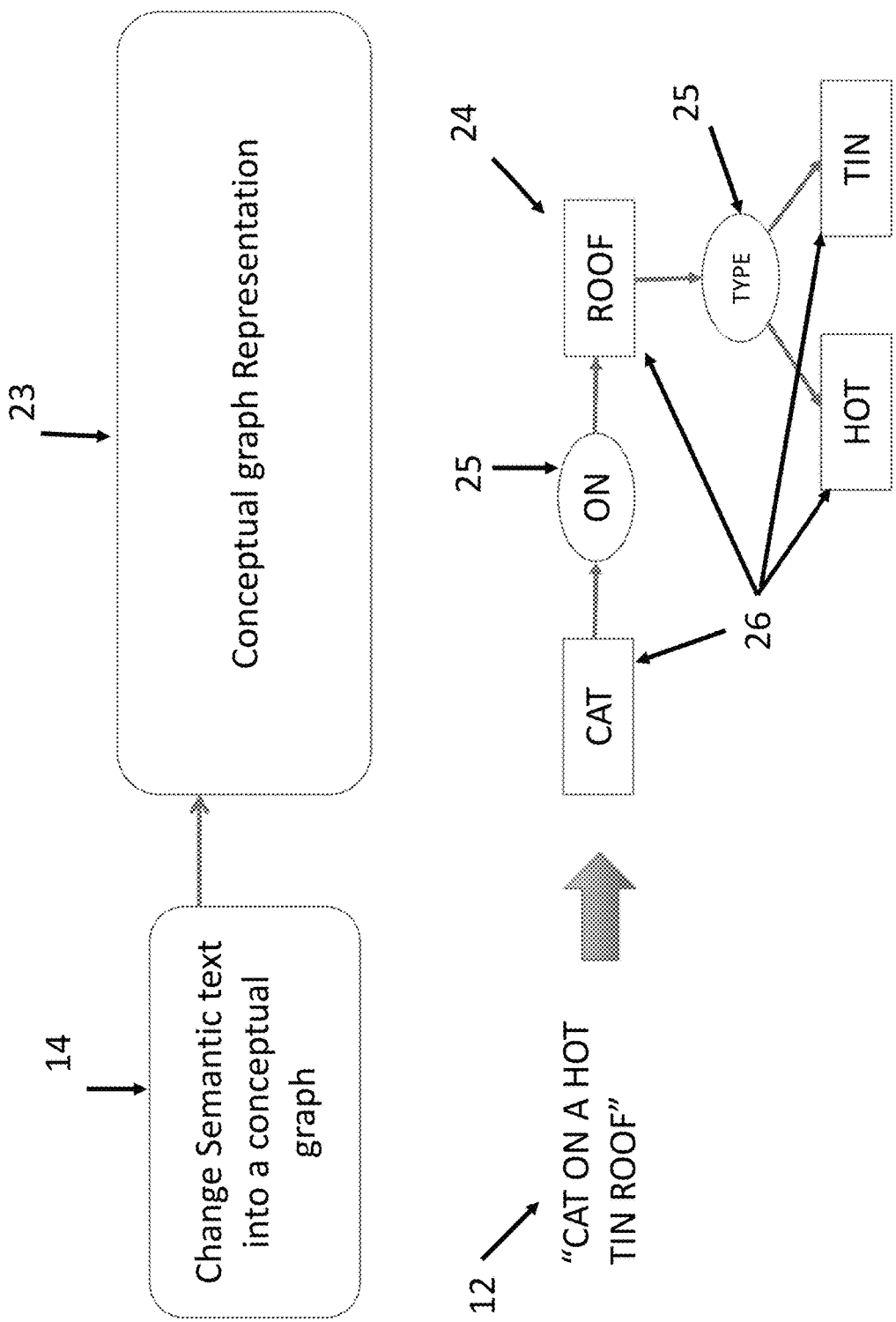

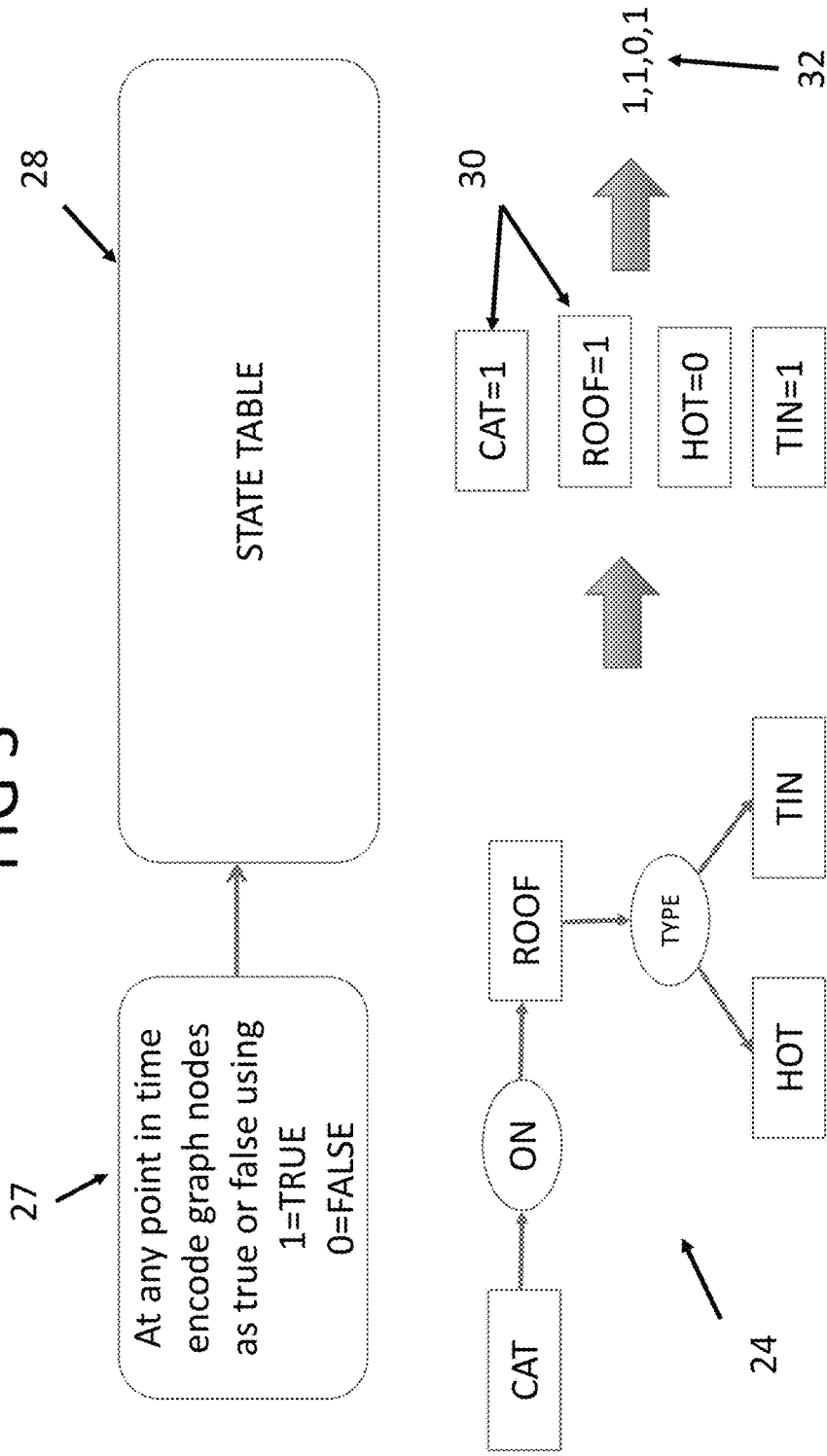

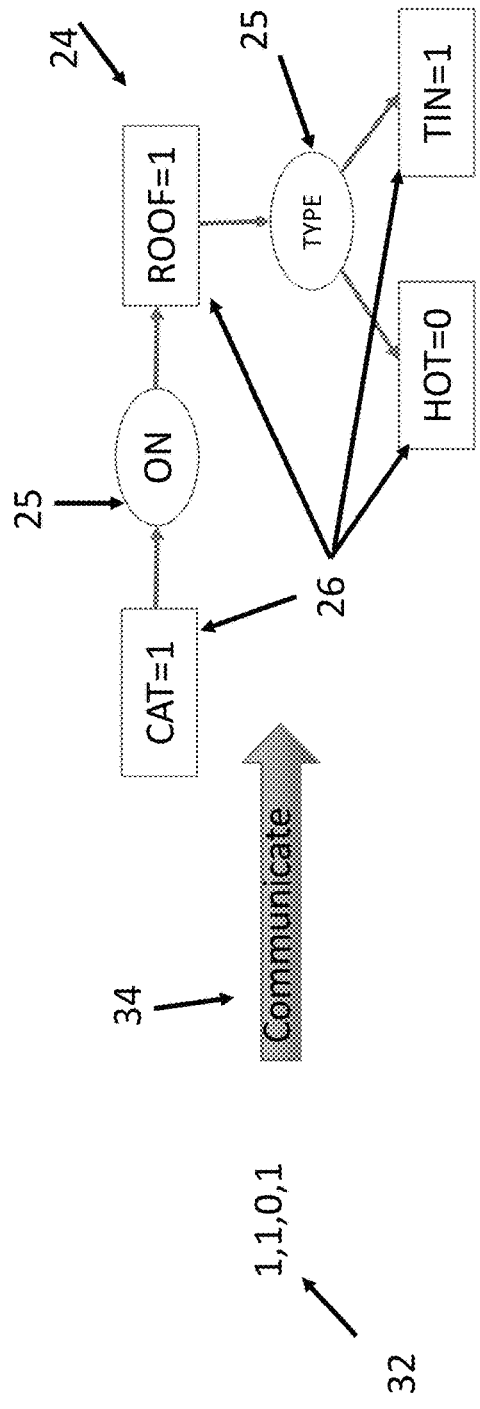

METHOD AND SYSTEM OF SEMIOTIC DIGITAL ENCODING

This is a non-provisional patent application claiming priority to U.S. Provisional Patent Application Ser. No. 62/447,719 filed Jan. 18, 2017 and entitled "Method and System of Semiotic Digital Encoding".

This non-provisional patent application is filed by applicant Andy Bevilacqua, a citizen of the United States, residing Huntsville, Ala., for the invention of a "Method and System of Semiotic Digital Encoding."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND

Technical Field

The present disclosure relates to a method and system of processing semiotic data. More particularly the present disclosure relates to a method and system of semiotic digital encoding for the transfer of the semiotic data and then subsequent digital decoding of the semiotic data for communication between entities.

Background Art

Semiotics is the study of signs and symbols as elements of communicative behavior. Semiotics deals with the function of those of signs and symbols in both artificially constructed and natural languages and comprises syntactics, semantics, and pragmatics. For example, one aspect of semiotics includes the study of languages and how humans communicate.

Encoding, in semiotics, is the process of creating a message for transmission by an addresser to an addressee. The complementary process—interpreting a message received from an addresser—is called decoding. Encoding, as a process of converting data into another format, has several uses for information processing needs including data transmission, storage, compression, and decompression.

The encoding and decoding of semiotic data has taken on a greater importance over the last decade or so due to the digitization of information. Information, and its exchange, is regarded as one of the greatest resources in the modern era. Data from September of 2016, explains that since 2011, the overall global population of people using the internet has grown 60 percent, from 2 Billion internet users to more than 3.4 billion people in 2016. Further, use of social media requiring the transfer of data has increased substantially. According to current research:

Since 2013, the number of Twitter posts increased 25% to more than 350,000 Tweets per minute;

YouTube usage has more than tripled in the last two years, with users uploading 400 hours of new video each minute of every day.

Instagram users like 2.5 million posts every minute.

Since 2013, the number of Facebook Posts shared each minute has increased 22%, from 2.5 million to 3 million posts per minute. This number has increased more than 300 percent, from around 650,000 posts per minute in 2011.

Facebook users also click the like button on more than 4 million posts every minute. That is nearly 6 billion Facebook posts liked each day.

Around 4 million Google searches are conducted worldwide each minute of every day.

Finally, 4 million Text messages are sent each minute in the U.S. alone Please see https://www.gwava.com/blog/internet-data-created-daily.

Further, according to The Radacati Group, 205 billion emails were sent each day in 2015. Their projections indicate that by 2019 that number will increase 20% to 246 billion emails each day. Please see http://www.radicati.com/wp/wp-content/uploads/2015/02/Email-Statistics-Report-2015-2019-Executive-Summary.pdf Further, research from April of 2015 shows that people worldwide create 2.5 quintillion (2,500,000,000,000,000,000) bytes of data every day. Additionally, that research stated that 90% of the world's data was created in the last two years preceding the study. Please see http://www.v-cloudnews.com/every-day-big-data-statistics-2-5-quintillion-bytes-of-data-created-daily/

From these numbers it is clear that the amount of data in the world is increasing. A key aspect contributing to the value of this data is the ability to transfer this data to other users of the data over a medium, such as a "wired" or "wireless" connection. The ability to expeditious transfer the data exponentially increases its value. These "users" can be both human and non-human, or contain some level of artificial intelligence to analyze the data, and the easier that the data can be comprehended by multiple "users" further increases its value.

One problem associated with this data transfer is the medium by which the data is transferred. These mediums are often referred to as having a bandwidth, or the capacity for the data transfer of an electronic communications system. All current transfer mediums have a maximum data transfer rate. This is usually based upon the physical components of the transferring devices or the "conduit" in which the data travels. These physical limitation are becoming increasing harder to minimize or compensate for given the sheer volume of data discussed above.

Another issue concerning the transfer of data includes the security of the same. Generally, most data that is transferred has some type of encryption. This is an attempt to prevent an unauthorized user from gaining the knowledge contained in the data if that unauthorized user gains access to the data. In the conventional art there have been thousands of attempts to improve the security of transferred data, or even the security of stored data, to try and prevent unauthorized access to the same. This is an ongoing issue in the data storage and transfer industries.

Most of the prior art does not attempt to contemplate the transfer of semiotic data at a machine language, or machine code, level in a secured manner. This lack of attention and focus has left a gap in the data transfer industry, especially when attempting to securely transfer data across low bandwidth system to sometimes less sophisticated users.

What is needed then are improvements to change structured semantic knowledge into a simple digital format and back again so that the digital format of the structured semantic knowledge can be easily and efficiently communicated across communication lines.

BRIEF SUMMARY

The present disclosure provides devices and methods semiotic digital encoding, transfer, and decoding of semiotic data.

In an embodiment, the present disclosure generally provides a process and method of taking semantic knowledge/information and converting it into a digital format, allowing that digital format to be transmitted or communicated to a receiver and processing the digital format back to the semantic knowledge/information.

In another embodiment, the present disclosure provides a method of taking structured text, changing the structured text into a conceptual graph, performing semiotic encoding, digitally communicating the encoded message, performing semiotic decoding, and changing the conceptual graph back into the structured text.

Numerous other objects, features and advantages of the present disclosure will be readily apparent to those skilled in the art upon a reading of the following description when taken in conjunction with the accompanying drawings.

BRIEF DESCRIPTION OF THE DRAWINGS

FIG. 1 is a representation of a system and method made in accordance with the current disclosure and used for semiotic digital encoding, transfer, and decoding.

FIG. 2 is a representation of a system and method changing the semantic text into a conceptual graph.

FIG. 3 is a representation of a system and method changing the semantic text into a conceptual graph and state table.

FIG. 4 is a representation of a system and method that shows the user receiving the communicated state table and comparing that to the conceptual graph to extract the meaning of the semantic text.

DETAILED DESCRIPTION

Referring now generally to FIGS. 1-4, one embodiment of the present disclosure provides system and method made used for semiotic digital encoding decoding and transfer and is generally designated by the numeral 10. The skilled artisan will recognize that objects in accordance with the present disclosure can assume different orientations when in use.

Referring now to FIG. 1, the system 10 starts with structured text 12. This structured text can be a text or message as desired, including complete sentences and normal expressions. The system 10 starts by converting the structured text 12 into a conceptual graph representation at step 14, and as further described below. Next, the system 10 performs a semiotic encoding of the structured text 12 by converting the structured text 12 into easily transferable data, such as machine code, as complied in a state transition table 23 or simply state table 28. As further described below, the state table 28 includes individual values 30 for the portions of the structured text 12 that can easily be transferred via a low bandwidth system. Next, the system allows communication of the state table 28 by a communication step 34 to a receiver having the conceptual graph representation 24. The receiver then uses the state table 28 to complete the conceptual graph representation 24 to extract the meaning of the original structured text 12.

FIG. 2 shows an example of more detail of a preferred embodiment of the conversion step 14 of the system 10. In this step, a conceptual graph representation 24 is formed from the structured text 12 at step 23. This formation can be contemporaneous to some of the other steps of the system. For example, the step of the creation of the state table 28, or the formation 23 of the conceptual graph representation 24, can preferably be created in advance. The conceptual graph representation 24 can take various form that can help establish the concept of the structured text 12 that is being transfer and communicated. For example, the conceptual graph representation 24 can use syntax to establish the generally grammatical form of the message being delivered. In FIG. 2, this is shown by the conceptual graph representation 24 with individual text fields 26 having connective fields 25 for the structured text 12.

After the conceptual graph representation 24 is established for the structured text 12, a state table 28 can be formed by step 27, as exampled in FIG. 3. FIG. 3 shows an example of more detail of the formation of a state table 28. In this step 27, for a given point in time an encoded graph nodes 30, or individual values 30, are given values base on true or false values: 1=true and 0=false. The encoded graph nodes 30 match up to the individual text fields 26 of the conceptual graph representation 24. This creates the state table 28 as exampled by the graph node output 32.

As seen in FIG. 4, once the state table 28 and graph node output 32 are established, the state table 28, and the graph node output 32, can be efficiently transferred/communicated in step 34 over a low bandwidth system. At the other end of the transmission, a user/receiver can receive the state table 28 and graph node output 32. That receiver will have the original conception graph representation 24 and then will begin recreating the conceptual graph representation 24 in step 36. The receiver will use the graph node output 32 to fill the individual text fields 26 of the conceptual graph representation 24 to recreate the original structured text 12. In this manner the message can be known to the receiver.

In this system, preferably, and in some instances necessarily, the starting point is the structured message/text 12 that establishes the relative positions of each word or piece of information. This facilitates the structure of the message and allows the binary nature of the transferred data to carry the desired message. Further, the receiving entity should have the same conceptual graph representation 24 as the sending entity to allow for the proper decoding. Further, knowing the transmission order of the graph node output 32 can be important to allow the receiver to reconstruct the conceptual graph representation 24 from the state table 28. Since the receiver has the knowledge of the relationship of state table 28 to the conceptual graph representation 24 created from the original structured text 12, the receiver is able to reconstruct the original structured text 12.

The current inventive method and system has many benefits. This can include the fact that the digital state table requires less bandwidth for transmission that typical ASCII transmissions. Further, this system and method is inherently secure. Anyone intercepting the communication would have to know both the conceptual graph representation 24 and the order of transmission of the elements of the state table 28 in order to reconstruct the structured text 12. This system and method can be used to efficiently and securely transfer data between users.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure.

What is claimed is:

1. A method of semiotic digital encoding comprising:

a transmitting computing device storing a plurality of individual text fields and a plurality of connective fields that are contained within a message to be sent;

the transmitting computing device forming a conceptual graph representation of the message from the plurality of individual text fields;

creating the conceptual graph representation using a predetermined syntax to establish a predetermined grammatical form;

the transmitting computing device encoding a plurality of encoded graph nodes which correspond with the individual text fields within the conceptual graph representation of the original message;

the transmitting computing device forming a state table and a transmission order from the plurality of encoded graph nodes;

the transmitting computing device transmitting the state table, the transmission order, and plurality of encoded graph nodes, but not the original message, to a receiving computing device; and the receiving computing device reconstructing the original message from the state table, the transmission order, and plurality of encoded graph nodes.

2. The method of claim 1, further comprising:
the receiving computing device processing the message.

3. The method of claim 1, further comprising:
formatting the state table, transmission order, and plurality of encoded graph nodes to be more easily transmittable than the original message.

4. The method of claim 1, further comprising:
the step of transmitting occurring within a low bandwidth communication system.

5. The method of claim 1, further comprising:
the step of forming a conceptual graph representation occurring prior to the step of storing.

* * * * *